United States Patent [19]

Roberts et al.

[11] 4,187,175

[45] Feb. 5, 1980

[54] TREATMENT FACILITY WITH BACKWASH CONTROL SYSTEM

[75] Inventors: Charles V. Roberts, Drexel Hill, Pa.; William F. Sarra, Bridgewater, N.J.; Peter J. Neuspiel, Media, Pa.

[73] Assignee: Robert Filter Manufacturing Company, Darby, Pa.

[21] Appl. No.: 918,593

[22] Filed: Jun. 23, 1978

[51] Int. Cl.² .......................................... B01D 23/24
[52] U.S. Cl. ................................. 210/80; 210/82; 210/108; 210/149; 210/275
[58] Field of Search ............... 210/80, 82, 108, 149, 210/275, 277

[56] References Cited

U.S. PATENT DOCUMENTS

| | | | |
|---|---|---|---|
| 1,892,951 | 1/1933 | Hughes | 210/108 |
| 2,376,912 | 5/1945 | Green | 210/275 X |
| 2,538,340 | 1/1961 | Tomek et al. | 210/80 |
| 2,858,024 | 10/1958 | Babcock | 210/108 |
| 2,902,158 | 9/1959 | Muller | 210/149 X |
| 3,931,009 | 1/1976 | Davis | 210/108 |

*Primary Examiner*—John Adee

[57] ABSTRACT

A treatment facility has a granular media bed for use in acting upon (e.g. filtering) liquid mixtures, such as industrial and municipal water and wastewater, and employs a backwash operation between treatment operations for cleaning or otherwise enhancing the quality of the bed. A control system for the backwash operation establishes a first backwash rate for washing and scouring the granular media to release suspended solids and/or other impurities from the bed. Thereafter the control system establishes a second and generally greater rate for removing the released impurities from the facility. Preferably the first rate is chosen to just completely fluidize the granular bed, at which point a pressure responsive control system detects a constant differential pressure (i.e. a zero change in differential pressure), and the second rate, which generally is greater than the first rate, is responsive to the temperature of the backwash liquid.

23 Claims, 2 Drawing Figures

TREATMENT FACILITY WITH BACKWASH CONTROL SYSTEM

BACKGROUND OF THE INVENTION

This invention relates to a treatment facility of the type that includes a granular media bed to remove suspended solids or other impurities from a liquid mixture, and that employs a backwash operation between treatment operations to restore or otherwise enhance the quality of the bed.

It is common practice to clean treatment facilities, such as filters including a granular media bed, by employing a backwashing operation between successive filter runs, that is, between successive filtering operations in which the impurity containing liquid, such as industrial and municipal water or wastewater, is directed through the granular bed to remove suspended solids. The backwashing action in such a filter essentially reverses the filtration process, and removes the impurities from the surfaces and interstices of the granular material forming the filter bed. Specifically, the liquid employed in the backwash operation, ordinarily water from a clear well or other suitable source, is forced through the filter bed opposite to the direction of filtration to both lift and agitate granules of the bed. This action releases impurities from the bed that were retained during the filter run. The cleaning effect during backwashing is greatly enhanced by causing the media granules to collide on a frequent basis, and this is best achieved by just completely fluidizing the entire portion of bed to be cleaned. It is in this fluidized condition that the individual media granules are, at the same time, closely enough spaced to each other so that a high probability exists for frequent collisions, and far enough apart to release the entrapped impurities.

Obtaining a high degree of granule collisions in the backwashing of the filter is extremely desirable; particularly when suspended solid impurities, in addition to being trapped in the media bed interstices, actually cling to the individual granules. The scrubbing and scouring action between granules resulting from their collision with each other is an effective mechanism for removing the latter referred to impurities.

In U.S. Pat. No. 2,858,024, issued to Russell H. Babcock on Oct. 28, 1958, a control system is provided to sense the essential cessation of the change in differential pressure through a sand filter bed as the backwash rate is being increased. The backwash rate at which this cessation takes place represents the minimum backwash rate at which the media bed is fully fluidized and is the rate for maximizing collisions between the sand granules. However, once this rate is reached Babcock suggests that it should be maintained for the entire backwashing operation. Although this may be the most desirable rate for separating impurities from the media itself, in most cases it is lower than the desired rate for removing the separated impurities from the filter chamber or basin. Therefore, carrying out the backwash operation as suggested by Babcock can result in unnecessarily prolonging the backwash operation, and thereby unduly increasing the "down" time of the filter (i.e. the time that the filter is unavailable for filtering). Moreover, after backwashing in the manner suggested by Babcock, an undesirably high quantity of impurities may remain in the filter because the backwash rate, while being effective to separate the impurities from the media, may not be effective to totally transport the impurities out of the filter chamber.

It has been recognized in the prior art that the viscosity of the backwash liquid plays an important role in the backwashing operation. Specifically, it is recognized that the backwash rate or velocity will need to be changed in response to changes in backwash liquid viscosity in order to obtain a desired level of bed expansion, as well as to transport impurities out of the filter chamber. It is also known that the viscosity of a backwash liquid, such as water, will vary with temperature; the viscosity of warm water being lower than that of cold water. Accordingly, to obtain the same desired degree of bed expansion it is necessary to employ a greater backwash rate of flow with warm water than with cold water.

Both U.S. Pat. Nos. 1,892,951 (Hughes) and 2,376,912 (Green) recognize that the viscosity of water is temperature dependent, and that the effect of different viscosities should be taken into account in backwashing a filter. Both Hughes and Green suggest that the best method of controlling the backwash operation is to vary the backwash rate, as is necessary, to achieve a constant, or desired level of filter bed expansion. To accomplish this result both patentees employ mechanical devices to detect when the bed has been expanded to a predetermined level. Applicants have found that such mechanical devices are not very reliable, and introduce undesirable mechanical components into the filter system.

Although many different backwash control systems have been devised, none of them, to the best of applicants' knowledge, have optimized both the separating function (i.e. the function of separating impurities from the interstices and surfaces of the granular media) and the removal function (i.e. the removal from the filter of the separated impurities) in a two stage backwash operation of the type forming the subject matter of the present invention.

SUMMARY OF THE INVENTION

In accordance with this invention applicants have recognized that it is highly desirable to control the backwash operation of a treatment facility having a granular media bed in two stages; that is, a first stage wherein washing and scouring the granular media to separate impurities is the primary objective, and a second stage wherein removal of these separated impurities is the primary objective. Preferably, the backwash rate established for each stage is determined by a different parameter of the backwashing operation, and although certain steps and controls disclosed in the Babcock U.S. Pat. No. 2,858,024 may be utilized, many features employed in this invention are not remotely suggested by Babcock.

In accordance with this invention the backwash rate employed to enhance the separation of impurities from the granular filter bed is that rate which is just sufficient to fluidize the part of the bed that is to be cleaned, or the entire bed if desired. The rate at which this occurs is generally accompanied by a pronounced change in the differential pressure characteristics across the bed. Specifically, as the backwash rate is gradually increased the differential pressure across the bed also increases until complete fluidization just takes place. At that point the differential pressure remains essentially constant, i.e the change in differential pressure approaches zero. It is at this backwash rate that the bed is just completely fluidized and that the granules forming the bed are optimally spaced to both maximize granuale collisions and release impurities trapped within the bed. This rate will hereinafter sometimes be referred to as the "minimum fluidization rate".

The second backwash rate usually will be higher than the first rate, and in the preferred form of this invention is responsive to the temperature of the backwash liquid. To this end a temperature probe is employed to monitor the temperature of the backwash liquid, and the control system suitably adjusts the second backwash rate in accordance with the detected temperature. The second backwash rate is chosen to most effectively remove from the filter the impurities separated from the media in the first stage of the backwash operation. This rate should be chosen to transport the impurities out of the filter as fast as possible without removing the filter bed granules or otherwise damaging the filter bed. This second rate will hereinafter sometimes be referred to as the "transport rate".

The most desirable transport rate is generally greater than the minimum fluidization rate, and is not as easily determined as the minimum fluidization rate. In fact, to the best of applicants' knowledge no one has dealt with the problem of determining, or setting the optimum "transport rate" after an initial backwash stage that has been optimized to separate impurities from the filter bed.

In the instant invention applicants have made use of the knowledge that viscosity of the backwash liquid is temperature dependent by actually controlling the transport velocity in response to the temperature of the backwash liquid. Unlike the earlier described prior art devices, applicants directly monitor the backwash liquid temperature, and control or adjust the backwash rate in response to the detected temperature. The particular transport rate desired at different backwash liquid temperatures can be determined empirically for the particular filtering conditions that exist. After this relationship between rate and temperature is established, and programmed into the backwash control system, highly reliable control of the transport rate is obtained by merely monitoring the temperature of the backwash liquid.

It is a general object of this invention to provide a treatment facility employing an efficient and reliable backwash control system.

It is a further object of this invention to provide a treatment facility in which different backwash rates are employed for separating impurities from a granular media bed and for transporting these impurities out of the facility.

It is a further object of this invention to provide a treatment facility in which a first backwash flow rate is established to maintain a predetermined pressure condition across at least a part of a granular media bed being backwashed, and a second and greater backwash flow rate is responsive to the temperature of the backwash liquid.

Other objects and advantages of this invention will become apparent by referring to the detailed description which follows, taken in conjunction with the drawings.

DESCRIPTION OF THE PREFERRED EMBODIMENTS OF THE INVENTION

As illustrative embodiments of this invention filters employing granular media beds are shown and described herein, together with the unique filter control system for controlling the filtration and backwashing operations thereof. However, it should be understood that this invention can be employed in other types of treatment facilities in which backwash systems are, or can be employed to clean or otherwise enhance the quality of a granular media bed between treatment operations.

Figure 1:
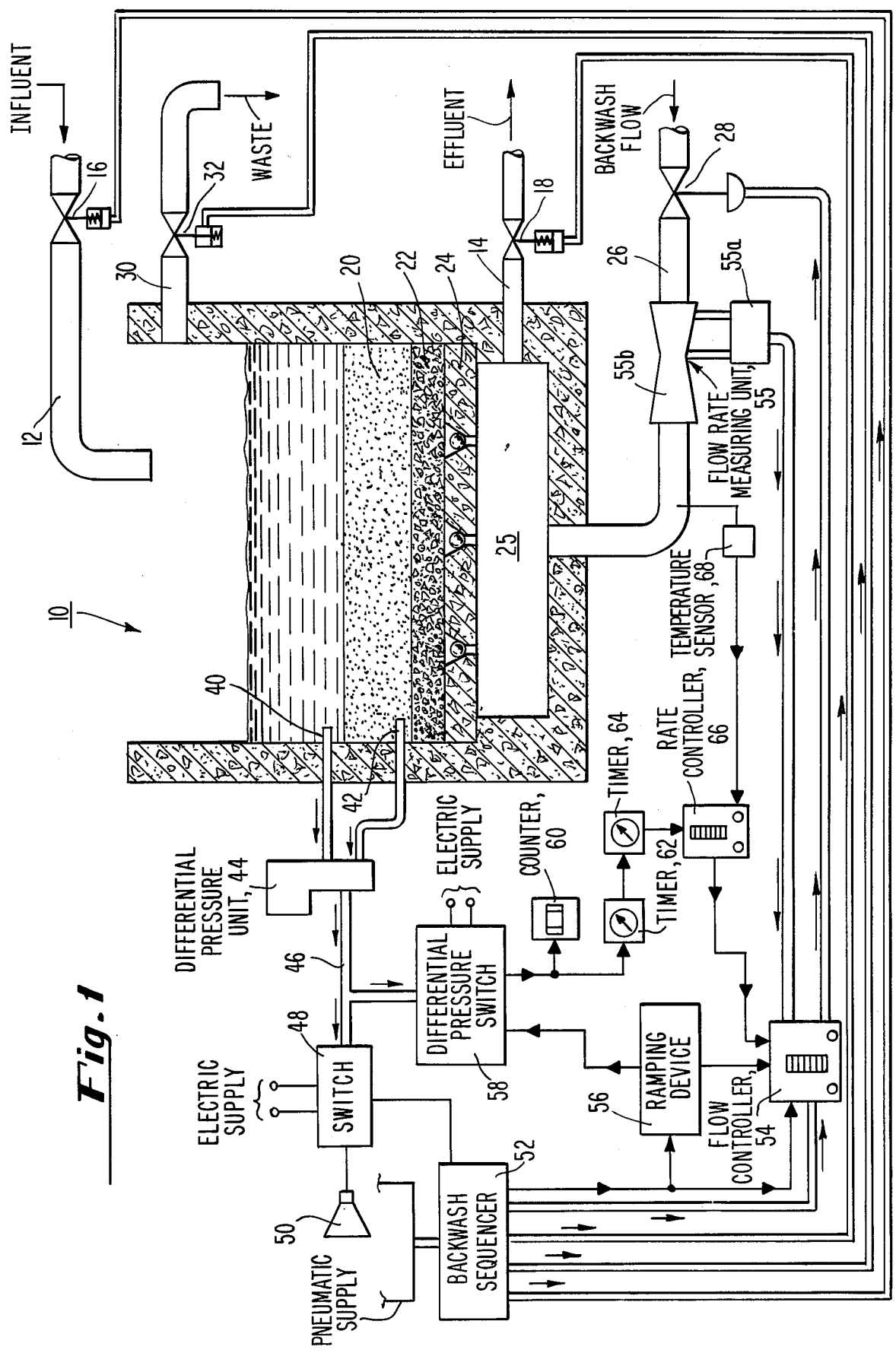
FIG. 1 is a schematic view of a treatment facility, in the form of a filter, employing a unique backwash control system in accordance with this invention.

Referring to FIG. 1, a filter 10 is of a conventional type including an inlet conduit 12 for delivering influent to be filtered, and an exit conduit 14 for the filtered effluent. A normally opened pneumatically controlled inlet valve 16 is included in the inlet conduit 12, and remains in its opened position during the filtering run to permit the influent to be directed into the filter. In a like manner, a normally opened pneumatically controlled exit valve 18 is included in the exit conduit 14, and remains in its opened position during the filtering run to permit the filtered effluent to exit the filter.

As the influent moves through the filter 10 it passes through a filter bed 20 of granular media, such as sand, anthracite, activated carbon, etc., and solid impurities in the influent are trapped in the bed in a well known manner. The filter bed 20 is supported on a conventional gravel support bed 22, and this support bed is in turn supported on a false bottom or other suitable support 24. In the illustrated embodiment the bottom 24 is a Wheeler bottom, manufactured by Roberts Filter Manufacturing Co., Darby, Pennsylvania 19023.

An underdrain chamber 25 is immediately beneath the false bottom 24, and communicates with both the exit conduit 14 and a backwash conduit 26. As a result of this construction the underdrain chamber 25 is a collection chamber during the filtering operation and a distribution chamber during the backwash operation. The backwash conduit 26 includes a pneumatically operated flow control valve 28 that is maintained in a closed position during the filtering operation. The filter 10 is also provided with a waste drain-off conduit 30 for receiving waste during the backwash operation, and a normally closed pneumatically controlled valve 32 associated with this conduit remains in its closed position during the filtering operation.

This invention resides in a unique control system for the filter 10, including the method by which the control system functions.

The control system of this invention includes a pressure sensing probe, or take-off pipe 40 having an open end positioned in the influent above the unexpanded filter bed 20, but below the drain-off conduit 30, to detect the pressure in this region. A similar pressure probe 42, or takeoff pipe is positioned adjacent the interface between the filter bed 20 and the gravel support 22 to detect the pressure in this region. Both probes 40 and 42 preferably include a screen, or other suitable member (not shown) which is capable of keeping foreign matter out, while permitting liquid to pass through them.

During the filtration operation the probe 40 is at the high pressure side of the filter bed 20, and the probe 42 is at the low pressure side. A differential pressure unit 44 receives the pressure detected from both probes, compares them, and provides a single pneumatic output 46 indicative of the pressure differential between the probes 40 and 42. The differential pressure unit 44 can be a Model 11 DM Receiver/Transmitter Unit sold by the Foxboro Co. of Foxboro, Ma., and adapted for mid-range zero.

The output 46 from the differential pressure unit during the filter run is lower than the output at zero flow (i.e. when the influent is maintained above the filter bed, but prior to the opening of the exit valve 18 in the exit conduit 14). As the flow rate of the influent through the filter bed 20 is increased from zero flow, the pressure detecting probe 42 will read at a lower value than the pressure detecting probe 40, and this difference will result in an even lower output 46 than the original output at zero flow.

As the filter bed 20 begins to entrap impurities suspended in the influent, and thereby becomes clogged, the pressure detected at 42, and hence the pressure differential transmitted at 46, will decrease until a predetermined or preset level is reached to close pneumatic switch 48. In other words the pneumatic switch is adjustable, and is set to close at a preselected pressure differential transmitted by the unit 44. The pressure switch can be a Meletron Model No. 2221, sold by Meletron of Los Angeles, Ca. Closing of the switch 48 can actuate a horn 50, or other suitable signalling device, to indicate to the filter operator that the backwash operation should be manually begun. At this point, if desired, the operator can manually actuate the pneumatic circuit for the purpose of closing valves 16 and 18, and opening valve 32 to prepare the filter for backwashing. Alternatively, the backwash operation can be started automatically, in which case the closing of the pneumatic switch 48 will energize a backwash sequencer 52 that includes conventional circuit elements arranged to control the backwash operation in the manner described hereinafter. If a horn is also employed to signal the end of a filtering run, the sequencer 52, after being energized for a preset period of time, will open the switch 48 to remove the horn from the circuit. However, the sequencer 52 will remain energized through suitable relays, in a well known manner, to control the backwash operation as will hereinafter be described.

When the backwash control sequencer 42 is energized it automatically actuates pneumatic valves 16 and 18 to close off the inlet conduit 12 and the exit conduit 14, respectively, to thereby stop the filter run. Note that this takes place at a preset bed loss indicative of the need to clean the filter bed 20. At the same time that the valves 16 and 18 are closed the sequencer 52 actuates the pneumatic valve 32 to open the waste drain-off conduit 30, and also actuates the pneumatic flow controller 54. The flow controller is of the type having a remote set, such as Foxboro Model No. 130F, and upon being actuated, it opens the pneumatic valve 28 in the backwash conduit 26 to a preset position for obtaining an initial preset flow to begin the backwash operation. This flow is set to be lower than the desired fludization rate to permit commencement of reverse flow through the bed 20 without damaging it. This initial rate is detected by the controller 54 through a hydraulic flow rate measuring unit 55 included in the backwash conduit 26. The flow rate measuring unit 55 can include a Foxboro 11 DM Transmitter 55a combined with a F & P 10F1070 Tube 55b.

After a preset time, determined by a conventional timedelay circuit in the backwash sequencer 52, a fluidization ramping device 56 is actuated to gradually increase the pneumatic pressure through the flow controller 54, and thereby gradually increase the opening of the pneumatic valve 28 to gradually increase the backwash flow rate. As the backwash flow rate increases, the backwash differential pressure output from the differential pressure transmitting unit 44 likewise increases. This increase in the output results from the pressure at probe 42 being greater then the pressure at the probe 40 and the increase continues at an essentially constant rate as the bed begins to expand. Upon complete fluidization of the bed the differential pressure becomes constant and the change in differential pressure abruptly becomes essentially zero. In other words, when the bed just becomes completely fluidized the pressure drop across it reaches a constant value. When this occurs the output 46 from the differential pressure unit 44 also remains constant, and thereby closes differential pressure switch 58 to stop and lock in the ramping device 56 so that the backwash rate will not be further increased. In other words, the backwash rate is maintained at the level required to just fluidize the bed, i.e. the "minimum fluidization rate".

The differential pressure switch 58 can be of various types; one representative type being Meletron Model No. 2262. Since the switch 58 is closed when it receives a constant input signal indicative of a zero change in differential pressure, it is kept out of the control circuit until the ramping device 56 is actuated to cause a change in differential pressure to take place. When the ramping device 56 is actuated to gradually increase the backwash rate through the filter 10, it also completes the circuit to the differential pressure switch 58 to permit it to operate as described above. If the switch 58 were in the circuit prior to actuation of the ramping device 56 it would receive a constant input signal 46 from the differential pressure unit 44, and would be closed to prevent the operation of the ramping device. To further explain, prior to actuation of the ramping device 56 the backwash rate through the filter bed is constant; thereby providing a constant differential pressure or head loss across the filter bed 20. This results in a constant output 46 from the unit 44 that would close the switch 58 if it were in the circuit. Closing the switch 58 would prevent actuation of the ramping device 56 and thereby prevent the backwash rate from being brought up to the minimum fluidization level. However, by bringing the switch 58 into the circuit after the ramping device 56 has been actuated, the backwash rate through the filter will gradually increase, thereby gradually changing the pressure drop across the filter bed to provide a variable output 46 until such time as complete fluidization is achieved. At that time, as described above, the output 46 will be constant to actuate the switch 58 and lock in the ramping device 56 at the proper operating condition to maintain the minimum fluidization backwash rate.

Closing of the switch 58 not only locks in the ramping device 56, but also counts down one unit toward zero on a preset counter 60, and actuates a preset fluidization timer 62. The preset counter 60 can be of any conventional type, such as an ATC Model No. 326, manufactured by Automatic Timing & Controls Co. in King of Prussia, Pa., and the setting on the counter 60 determines the number of times that the backwash cycle will be repeated prior to returning to a filtration run, as will be explained in greater detail later in this application. The timer 62 can also be of any conventional type, such as ATC Model No. 325, and controls the length of time at which the backwash rate is maintained at the minimum fluidization level.

After the timer 62 times out it automatically starts the transport stage of the backwash operation. In this stage the backwash flow rate is adjusted to a level that is most efficient, or desired, for removing from the filter 10 those particular impurities separated from the filter bed 20 during the previous fluidization stage. This rate, in virtually all cases, will be higher than the minimum fluidization rate.

The timing out of the timer 62 automatically actuates timer 64, which in turn actuates a programmable transport stage rate controller 66, such as Foxboro Model No. 135ZG, for the length of time set on timer 64. The time that is set on timer 64 is the length of time that the transport stage is active. The controller 66, upon being actuated, will receive an input signal from a temperature sensor 68 employed to sense the temperature of the backwash liquid, and in response to the input signal, will compute the appropriate signal to be sent to the flow controller 54 to adjust the control valve 28 for establishing the desired transport rate or velocity, as detected by the flow rate measuring unit 55.

The rate controller 66 is programmed to change the backwash flow rate based on changes in the temperature of the backwash water; a parameter that is indicative of viscosity. Applicants have found that changes in viscosity of the backwash water, due to change in temperature, should be taken into account in establishing the desired transport rate for removing fluidized particulate impurities from the filter 10, after those impurities have been separated from the filter bed 20 in the previous fluidization stage of the backwash operation. For example, if temperature of the backwash water decreases, its viscosity will increase, and if the transport velocity or rate is maintained at the same level, it can, because of the higher viscosity of the backwash water, actually wash out media granules. Therefore, when the temperature of the backwash water decreases the transport rate is decreased, and when the temperature of the backwash water increases the transport rate is increased.

The desired relationship between backwash rate and the backwash liquid temperature can be determined empirically for different filters by employing trial backwash runs at different backwash temperatures. This relationship can then be programmed into the transport stage rate controller 66 to provide the desired automatic control of the backwash rate during the transport stage of the backwash operation.

If the preset counter 60 is at zero when the timer 64 times out, the backwash sequencer 52 will actuate the flow controller 54 to close the pneumatic valve 28 in the backwash conduit 26, and thereby stop the flow of backwash water into the filter 10.

The sequencer 52 will also be actuated to permit the control valve 32 in the drain-off conduit 30 to move to its normally closed position, and to permit the inlet and exit valves 16 and 18 in the inlet conduit 12 and exit conduit 14 to move to their normally opened position. This prepares the filter 10 for its filtering mode of operation.

If the cycle counter 60 has not reached zero at the time that the transport rate timer 64 times out, the backwash sequence will be repeated. Specifically, the backwash sequencer 52 will be operated to actuate the flow controller 54 to establish a setting for pneumatic valve 28, for a preset time, that provides an initial backwash flow rate lower than the fluidization rate. Thereafter, the sequencer 52 will energize the ramping device 56, and the sequence of operations through the fluidization rate stage and the transport rate stage will be repeated. The sequence will continue to be repeated until counter 60 ultimately reaches zero, at which time a filter run will be commenced. Thus, it should be apparent that the counter 60 is employed to set the number of times that the backwash operation will sequencially pass through the minimum fluidization rate and the transport rate prior to returning to the next filtering run. This arrangement provides a great deal of flexibility in backwashing the filter. For example, if the influent being treated is heavily contaminated, resulting in the entrapment of a large quantity of impurities in the filter bed 20 during the filter run, it may be most desirable and efficient to sequence through the minimum fluidization rate and the transport rate several times in a backwash cycle, rather than attempting to separate all of the impurities out of the bed in a single fluidization stage, and then attempting to remove all of the separated impurities from the filter chamber in a single transport stage.

Figure 2:
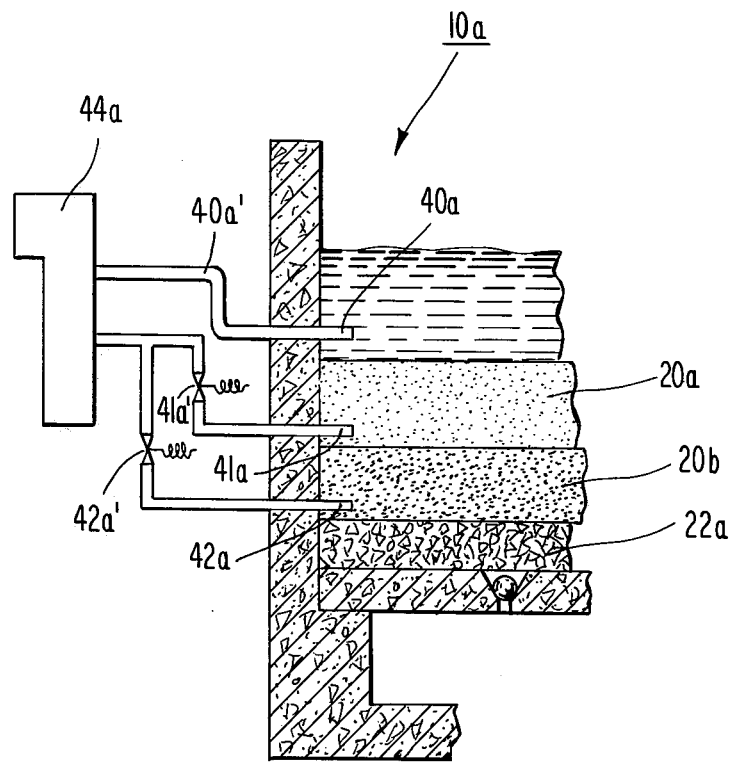
FIG. 2 is a schematic fragmentary view showing a modified portion of the FIG. 1 filter.

Referring to FIG. 2, a modified filter 10a is shown with portions of its control circuitry that differ from the circuitry shown in FIG. 1. Specifically, the filter 10a is a multi-media unit including two different types of media, 20a and 20b, respectively. For example, the upper media 20a can be anthracite, and the lower media 20b can be sand. However, the specific types or quantities of different media employed in the filter is not considered to be a limitation on the present invention.

If the media 20a and 20b have identical backwash rise rates, that is, if they both become completely fluidized at the same backwash rate, the control system shown in FIG. 1 can be employed by positioning the pressure detecting probe 40 above the top of the media 20a, substantially in the same location that it occupies in the FIG. 1 embodiment, and by positioning the lower pressure detecting probe 42 at the interface between the gravel bed and the lower media layer 20b.

However, it may be desirable to form the filter bed with an upper media layer 20a that will become fluidized at a different backwash rate than the media layer 20b. In this case, it may be desirable to carry out the backwash operation by selectively and individually fluidizing the layers 20a and 20b during different phases of the backwash operation. For example, it may be desirable to completely fluidize the upper layer 20a more times than the lower layer 20b, since the upper layer will initially receive the impingement of the influent, and will tend to become clogged with impurities more frequently than the lower layer 20b. Thus, the upper layer 20a may require more frequent scouring, and therefore more frequent fluidization than the lower layer. In such a situation the media employed to form the upper layer will be chosen to permit the upper layer to expand at a lower backwash flow rate than the lower layer. Then, for example, the backwash operation may be carried out to establish minimum fluidization rate conditions for the upper layer 20a during every backwash cycle, and on a less frequent basis for the lower layer 20b. In order to control the backwash rate to selectively fluidize only certain layers of a multimedia filter, it may be desirable to include a pressure detecting probe at the interface of each of the different media and also a reference probe above the top media layer.

In the variant shown in FIG. 2 a first pressure probe 41a is placed adjacent the interface between the media 20a and the media 20b, and a second pressure probe 42a is placed adjacent the interface of the lower media 20b and the gravel layer 22a. These two pressure probes, through a single connection, are joined to a differential pressure unit 44a, which can be identical to the differential pressure unit 44 (FIG. 1). The probes 41a and 42a are individually valved at 41a' and 42a', respectively, to communicate the desired probe with the unit 44a. A reference probe 40a is positioned above the upper media layer 20a, and is also in communication with the differential pressure unit 44a. In this arrangement the reference probe 40a will either coact with the probe 41a or the probe 42a to monitor the pressure drop across the media layer 20a or 20b, respectively. Once the desired connection to the pressure unit 44a is established, by opening one of the valves 41a' or 42a', the control system will operate in the same manner as described above in connection with FIG. 1 by monitoring the headloss across the desired layer(s) of the filter bed to be expanded, and locking in a backwash rate which just completely fluidizes those layer(s). Most preferably an automatic control circuit is included in the programmed sequencer (not shown) to automatically open and/or close the solenoid valves 41a' and 42a' associated with the respective pressure probes 41a and 42a in a desired sequence to thereby control the backwash operation as desired.

In the FIG. 2 system a filter run can be terminated automatically by programming the controls to activate the backwash sequencer at a predetermined headloss through the entire filter bed, or only part of it, as determined, or detected by pressure probes that are communicated with the differential pressure unit 44a.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. A backwash control system for a treatment facility of the type having a granular media bed for use in treating liquid mixtures, such as industrial and municipal water and wastewater, said system including flow control means (54, 56) for establishing a first backwash flow rate at which a predetermine pressure condition exists across at least a part of the media bed, pressure detecting means (44) for sensing the predetermine pressure condition and means (58) responsive to the detection of said predetermine pressure condition for acting upon the flow control means to maintain said first backwash flow rate; said system further including rate control means (66), temperature sensing means (68) for providing an input to said rate control means that is representative of the temperature of the backwash liquid, said rate control means providing an output related to said input for aiding in establishing a second backwash liquid flow rate responsive to the temperature of the backwash liquid.

2. The control system of claim 1 including first timing means for controlling the length of time of the first backwash liquid flow rate, and second timing means for controlling the length of time of the second backwash liquid flow rate.

3. The control system of claim 2 including a counter for setting the number of times the backwash operation will pass through the first backwash liquid flow rate and the second backwash liquid flow rate between successive treatment operations.

4. A method of backwashing a treatment facility of the type having a granular media bed for use in treating liquid mixtures, such as industrial and municipal water and wastewater, said method including the steps of:
(a) establishing a first predetermined backwash liquid flow rate responsive to a predetermine pressure condition across the media bed for scouring the bed to release suspended solids or other impurities therefrom, and thereafter;
(b) establishing a second and greater backwash liquid flow rate in response to the temperature of the backwash liquid for removing the released impurities from the facility.

5. The method of claim 4 including establishing the first backwash liquid flow rate to just fluidize at least a portion of the bed to be scoured to a level at which the head loss across said portion remains substantially constant.

6. The method of claim 5 including the steps of commencing the backwashing at a flow rate below the first backwash liquid flow rate, increasing the backwash liquid flow rate while monitoring changes in head loss across at least the portion of the media bed to be scoured and, in response to the head loss remaining substantially constant, ceasing the increase in the backwash flow rate to thereby establish the first backwash liquid flow rate.

7. The method of claim 4 wherein the step of establishing the second backwash liquid flow rate in response to the temperature of the backwash liquid is carried out by increasing the rate as the backwash liquid temperature rises and by decreasing the rate as the backwash liquid temperature decreases.

8. The method of claim 4 including backwashing at the first rate for a predetermined period of time and backwashing at the second rate for a predetermined period of time.

9. The method of claim 8 including setting the period of time at the first backwash rate independently of setting the period of time at the second backwash rate.

10. The method of claim 4 including repeating steps (a) and (b) a predetermined number of times between successive treatment operations.

11. The method of claim 4 including the steps of forming the media bed in layers of different types of granular particles and establishing the first backwash rate in response to a predetermined pressure condition across one or more of the layers.

12. The method of claim 11 including monitoring the head loss across one or more of the layers while gradually increasing the backwash liquid flow rate from a level below the desired first backwash liquid flow rate until the head loss across the portion of the bed being monitored remains substantially constant, and then ceasing the increase in the backwash liquid flow rate to thereby establish the first backwash liquid flow rate.

13. The method of claim 12 wherein the first backwash liquid flow rate just fluidizes only some of the layers of the bed.

14. A method of backwashing a treatment facility of the type having a granular media bed for use in treating liquid mixtures, such as industrial and municipal water and wastewater, said method including the steps of:
 (a) establishing a first backwash liquid flow rate responsive to pressure conditions across at least a portion of the media bed, and thereafter;
 (b) establishing a second backwash liquid flow rate responsive to the temperature of the backwash liquid.

15. The method of claim 14 including increasing the second backwash liquid flow rate in response to rises in backwash liquid temperature and decreasing the second backwash liquid temperature.

16. The method of claim 14 including establishing the first backwash liquid flow rate to just fluidize at least a portion of the media bed to a level at which the head loss across that portion of the bed remains substantially constant.

17. The method of claim 14 including initially commencing backwashing at a flow rate below the first backwash flow rate, gradually increasing the flow rate while monitoring changes in head loss across at least a portion of the media bed and, in response to a predetermined head loss condition ceasing the step of increasing the backwash flow rate.

18. The method of claim 17 wherein the step of ceasing the increase in backwash liquid flow rate takes place when the head loss being monitored reaches a substantially constant level.

19. The method of claim 14 including maintaining the first backwash liquid flow rate for a predetermined period of time.

20. The method of claim 19 including repeating the first and second backwash flow rates a predetermined number of times between successive filter runs.

21. The method of claim 14 including forming the granular media bed in layers of different granular materials and establishing the first backwash liquid flow rate in response to a predetermined pressure condition across one or more of the layers.

22. The method of claim 21 including establishing the first backwash liquid flow rate in response to predetermined pressure conditions across less than all of the layers.

23. The method of claim 21 including establishing the first backwash liquid flow rate through one or more layers more frequently than through other layers.

* * * * *